United States Patent
Shiina (10) Patent No.: US 11,300,836 B2
(45) Date of Patent: Apr. 12, 2022

(54) DISPLAY DEVICE

(71) Applicant: Japan Display Inc., Tokyo (JP)

(72) Inventor: Hideki Shiina, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/142,326

(22) Filed: Jan. 6, 2021

(65) Prior Publication Data

US 2021/0124195 A1  Apr. 29, 2021

Related U.S. Application Data

(63) Continuation of application No. PCT/JP2019/025094, filed on Jun. 25, 2019.

(30) Foreign Application Priority Data

Jul. 13, 2018  (JP) .............................. JP2018-133058

(51) Int. Cl.
  *G02F 1/1339* (2006.01)
  *G02F 1/1362* (2006.01)
  *G09G 3/36* (2006.01)

(52) U.S. Cl.
  CPC ...... *G02F 1/1339* (2013.01); *G02F 1/136286* (2013.01); *G09G 3/3674* (2013.01)

(58) Field of Classification Search
  None
  See application file for complete search history.

(56) References Cited

U.S. PATENT DOCUMENTS

| | | |
|---|---|---|
| 2008/0137020 A1 | 6/2008 | Takahashi et al. |
| 2009/0109369 A1 | 4/2009 | Morishita |
| 2010/0053531 A1 | 3/2010 | Kamada et al. |
| 2011/0102719 A1 | 5/2011 | Kakehi et al. |
| 2012/0257151 A1 | 10/2012 | Teramoto et al. |

(Continued)

FOREIGN PATENT DOCUMENTS

| | | |
|---|---|---|
| JP | 2008-165179 A | 7/2008 |
| JP | 2009-109562 A | 5/2009 |

(Continued)

OTHER PUBLICATIONS

International Search Report dated Aug. 6, 2019 for the PCT application No. PCT/JP2019/025094, with English translation.

*Primary Examiner* — James A Dudek
(74) *Attorney, Agent, or Firm* — Michael Best & Friedrich LLP (57) ABSTRACT

A display device includes a first substrate having a pad, a second substrate having a shield conductive layer, and a conductor connected to the pad and the shield conductive layer. The first substrate includes a first wiring provided under the pad and the pad includes an organic insulation film provided so as to cover the first wiring and a transparent conductive film provided over the organic insulation film. The transparent conductive film includes a first transparent conductive film provided over the organic insulation film and a second transparent conductive film connected to the first transparent conductive film. The first transparent conductive film is provided so as to avoid an upper part of the first wiring in a plan view and the second transparent conductive film is provided so as to cover the first wiring and the first transparent conductive film in a plan view.

11 Claims, 9 Drawing Sheets

(56) References Cited

U.S. PATENT DOCUMENTS

2017/0146878 A1   5/2017   Hirata et al.
2017/0235182 A1   8/2017   Abe et al.
2019/0011757 A1*  1/2019   Abe .................. G02F 1/136227

FOREIGN PATENT DOCUMENTS

| JP | 2010-055005 A | 3/2010 |
| JP | 2011-095451 A | 5/2011 |
| JP | 2012-220677 A | 11/2012 |
| JP | 2017-097040 A | 6/2017 |
| JP | 2017-146450 A | 8/2017 |

* cited by examiner

DISPLAY DEVICE

CROSS-REFERENCE TO RELATED APPLICATION

This application is a Bypass Continuation Application of PCT international Application No. PCT/JP2019/025094 filed on Jun. 25, 2019, which claims priority to Japanese Patent Application No. 2018-133058, filed on Jul. 13, 2018, the entire contents of which are incorporated herein by reference.

BACKGROUND OF THE INVENTION

The present invention: relates to a display device; and specifically is applicable to a display device of an IPS system.

In a display device of an IPS (In Plane Switching) system, a transparent conductive layer for shield is formed on the outside of a facing substrate and is connected to an earth pad provided on a TFT substrate side with a conductive tape in order to prevent noise (Japanese Unexamined Patent Application Publication No. 2017-146450).

A display panel in a display device generally has a display area where a plurality of pixels are formed and a frame area provided so as to surround the outer circumference of the display area. In recent years for example, in smartphones, mobile phones, etc., the frame area has been narrowed to increase the proportion of the display area when the display panel is viewed from the top surface.

SUMMARY OF THE INVENTION

In a display device of an IPS system, various wirings such as a power supply wiring and an inspection wiring may sometimes be placed under an earth pad when a frame area is narrowed.

The present inventors have found that, in a configuration of placing a power supply wiring of a high potential under an earth pad, if an energization test of supplying electric power and operating a display device is carried out under a high temperature and high humidity environment, the earth pad may sometimes corrode because of the configuration of the earth pad. That is, a vertical electric field is generated between the earth pad and the power supply wiring by a potential difference between the earth pad and the power supply wiring. The earth pad corrodes due to the effects of the vertical electric field and moisture.

An object of the present invention is to provide a configuration that can improve the reliability of a display device.

Other problems and novel features will be obvious from the descriptions and attached drawings in the present specification.

The following is a brief description of a typical example of the present invention.

That is, a display device includes a first substrate having a pad, a second substrate having a shield conductive layer, and a conductor connected to the pad and the shield conductive layer. The first substrate includes a first wiring provided under the pad and the pad includes an organic insulation film provided so as to cover the first wiring and a transparent conductive film provided over the organic insulation film. The transparent conductive film includes a first transparent conductive film provided over the organic insulation film and a second transparent conductive film connected to the first transparent conductive film. The first transparent conductive film is provided so as to avoid an upper part of the first wiring in a plan view and the second transparent conductive film is provided so as to cover the first wiring and the first transparent conductive film in a plan view.

DETAILED DESCRIPTION OF THE PREFERRED EMBODIMENTS

Embodiments according to the present invention are hereunder explained in reference to the drawings.

Meanwhile, the disclosure is just an example and appropriate modifications that a person skilled in the art can easily achieve while maintaining the gist of the invention are naturally included in the scope of the present invention. Further, although a width, a thickness, a shape, etc. of a part may sometimes be expressed more schematically than an actual aspect in order to explain a drawing more clearly, it is just an example and does not limit the interpretation of the present invention.

Furthermore, in the present specification and the drawings, it sometimes happens that an identical reference numeral is given to an element similar to an element that has already been described in a previously shown drawing and detailed explanation may be omitted as appropriate.

In the present embodiment, a liquid crystal display device is disclosed as an example of a display device. The liquid crystal display device can be used for various devices such as a smartphone, a tablet terminal, a mobile phone terminal, a personal computer, a television receiver, an in-vehicle device, a game machine, etc., for example.

Meanwhile, an expression such as "upper" or "lower" in explaining a drawing in the ranges of the present specification and the claims represents a relative positional relationship between a target structure and other structures. Specifically, when viewed from a side, the direction from a first substrate (array substrate) to a second substrate (facing substrate) is defined as "upper" and the opposite direction is defined as "lower".

Further, "inside" or "outside" shows a relative positional relationship of two parts with respect to a display area. In other words, "inside" indicates a side relatively closer to a display area than another side and "outside" indicates a side relatively remoter from another side. The definitions of "inside" and "outside" cited here however are based on the state of not folding a liquid crystal display device.

A "display device" refers to a general display device to use a display panel and display an image. A "display panel" refers to a structure to use an electro-optic layer and display an image. For example, the term "display panel" sometimes refers to a display cell including an electro-optic layer or sometimes refers to a structure of mounting another optical member (for example, a polarizing member, a backlight, a touch panel, etc.) over a display cell. On this occasion, a liquid crystal layer, an electrochromic (EC) layer, etc. are also included in the "electro-optic layer" unless there is a technical contradiction. Although embodiments will be described later by exemplifying a liquid crystal panel including a liquid crystal layer as a display panel therefore, applications to display panels including aforementioned other electro-optic layers are not excluded.

(Overall Configuration Example of Display Device)

Figure 1:
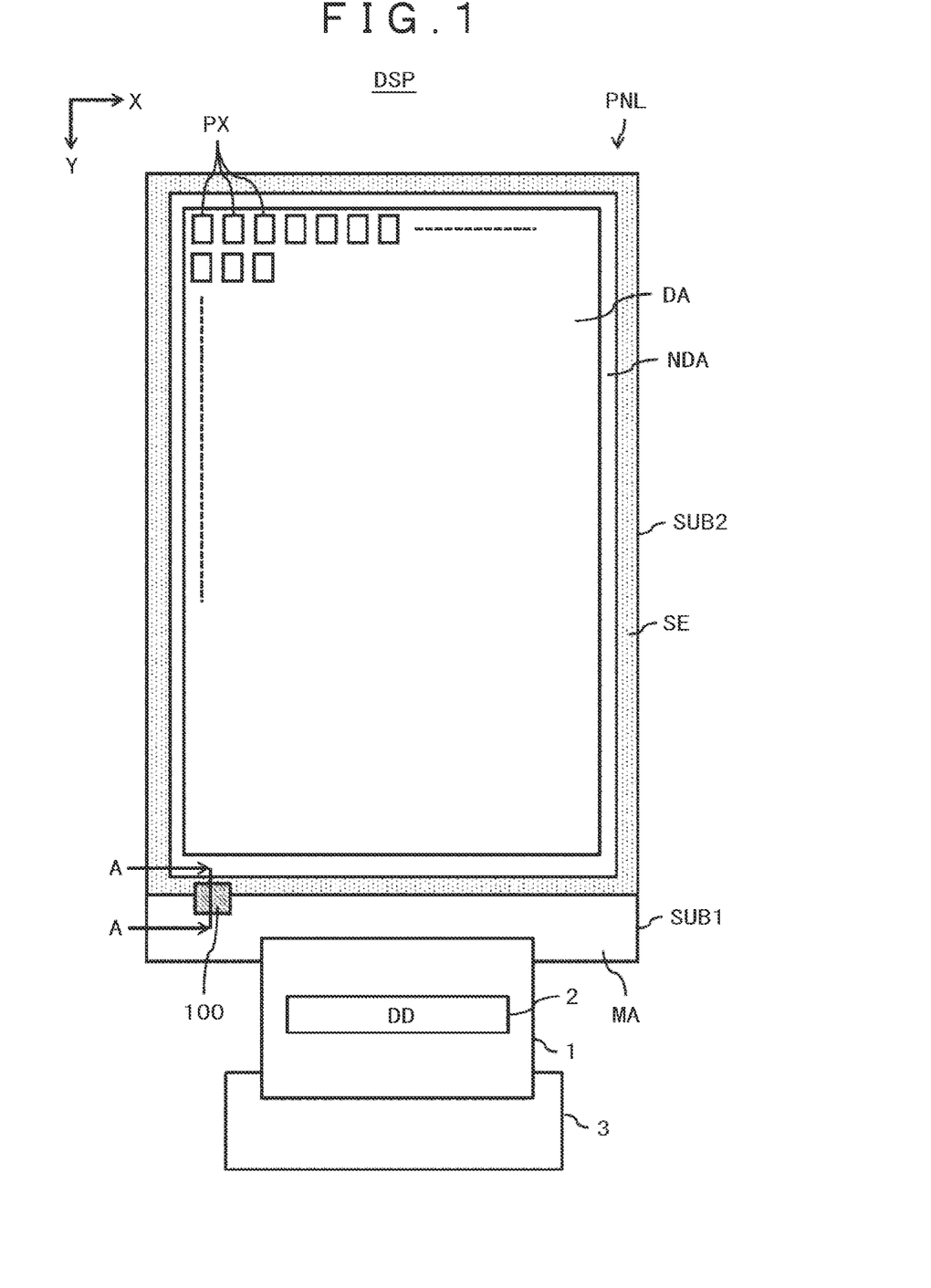
FIG. 1 is a plan view showing an appearance of a display device DSP according to the present embodiment.

FIG. 1 is a plan view showing an appearance of a display device DSP according to the present embodiment. The display device DSP has a display panel PNL, a flexible printed circuit board 1, an IC chip 2, and a circuit board 3. The display panel PNL is a liquid crystal display panel of an IPS system and has a first substrate (also referred to as an array substrate) SUB1, a second substrate (also referred to as a facing substrate) SUB2, a liquid crystal layer LC, and a sealing material SE, the last two to be described later.

The display panel PNL has a display section (display area) DA to display an image, a non-display section (non-display area, frame area) NDA of a frame shape surrounding the display section DA. The second substrate SUB2 faces the first substrate SUB1. The first substrate SUB1 has a mounting section MA extending in a second direction Y from the second substrate SUB2. The sealing material SE is located in the non-display section NDA, bonds the first substrate SUB1 and the second substrate SUB2, and seals the liquid crystal layer LC.

The display section DA has a plurality of pixels PX placed in a matrix in a first direction X and the second direction Y.

The flexible printed circuit board 1 is mounted over the mounting section MA and connected to the circuit board 3. The IC chip 2 is mounted over the flexible printed circuit board 1. Note that the IC chip 2 may also be mounted over the mounting section MA. The IC chip 2 includes a display driver DD to output signals necessary for image display in a display mode of displaying an image.

The display panel PNL according to the present embodiment may be any of a transparent type having a transparent display function of displaying an image by selectively transmitting light from the back side of the first substrate SUB1, a reflective type having a reflective display function of displaying an image by selectively reflecting light from the front side of the second substrate SUB2, and a semi-transparent type having a transparent display function and a reflective display function.

In the case of an IPS (In Plane Switching) system, the transmittance of a liquid crystal layer LC is changed by rotating liquid crystal molecules by an electric field (lateral electric field) parallel to a substrate main surface (SUB1, SUB2) and hence excellent viewing angle characteristics are obtained. In the IPS system, basically it is unnecessary to form a facing electrode in the facing substrate SUB2. The substrate main surface cited here is a plane parallel to an X-Y plane defined by a first direction X and a second direction Y. The display panel PNL may also have any configuration corresponding to a display mode of using a vertical electric field along the normal of the substrate main surface, a display mode of using an inclined electric field inclined diagonally with respect to the substrate main surface, or a display mode of using the lateral electric field, the vertical electric field, and the inclined electric field in combination as appropriate.

FIG. 1 is a liquid crystal display panel PNL of the IPS system and a shield conductive layer (ITO for shield) is formed over the back surface or the upper side of the facing substrate SUB2. An earth pad is formed at the mounting section MA in order to connect the ITO for shield to a reference potential such as an earth potential or a ground potential and the earth pad and the ITO for shield of the facing substrate SUB2 are electrically connected with a conductive member (conductor) 100 for example. As the conductive member 100, a conductive tape, a conductive resin, a conductive paste, or the like can be used. The conductive tape is configured by forming an adhesive in which conductive minute particles are dispersed over one surface of a tape including a metal such as aluminum (Al) or copper (Cu), for example.

(Circuit Configuration Example of Display Device)

Figure 2:
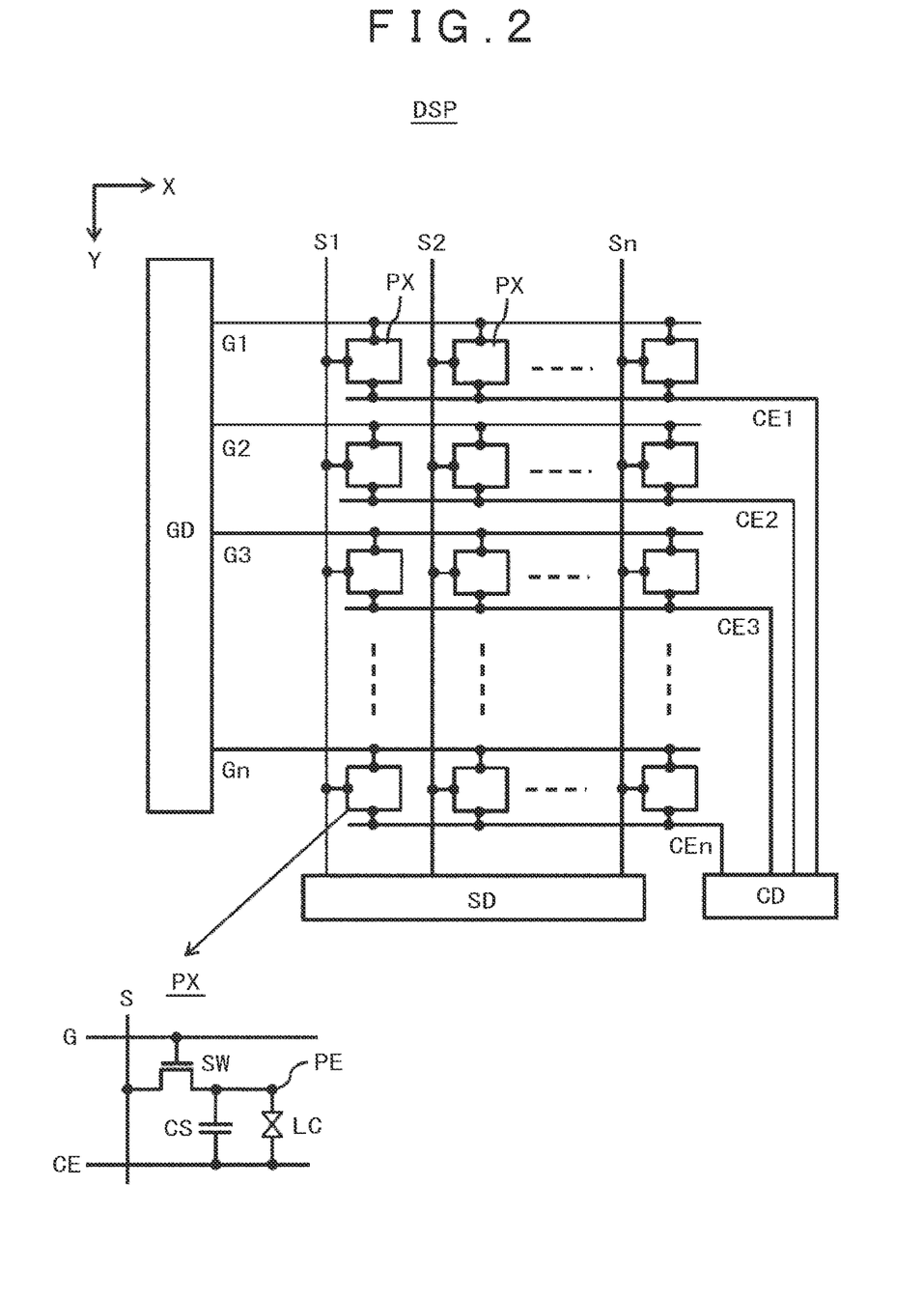
FIG. 2 is a view showing a basic configuration of pixels PX and an equivalent circuit of a display device DSP.

FIG. 2 is a view showing a basic configuration of pixels PX and an equivalent circuit of a display device DSP. A plurality of pixels PX are placed in a matrix in a first direction X and a second direction Y. A plurality of scan lines G (G1, G2, ...) are connected to a scan line drive circuit GD. A plurality of signal lines S (S1, S2, ...) are connected to a signal line drive circuit SD. A plurality of common electrodes CE (CE1, CE2, ...) are connected to a voltage supply unit CD of common voltage (Vcom) and placed over the pixels PX. One pixel PX is connected to one scan line, one signal line, and one common electrode CE. Note that the scan lines G and the signal lines S may not necessarily extend linearly and some of them may bend. For example, even if some of the signal lines S bend, the bent signal lines S are regarded as extending in the second direction Y.

Each of the pixels PX has a switching element SW, a pixel electrode PE, a common electrode CE, a liquid crystal layer LC, etc. The switching element SW includes a thin film transistor (TFT) for example and is electrically connected to a scan line G and a signal line S. The scan lines G are connected to the respective switching elements SW in respective pixels PX lined up in the first direction X. The signal lines S are connected to the respective switching elements SW in respective pixels PX lined up in the second direction Y. A pixel electrode PE is electrically connected to a switching element SW. Each of the pixel electrodes PE faces a common electrode CE and drives a liquid crystal layer LC by an electric field generated between the pixel electrode PE and the common electrode CE. A retention capacitance CS is formed between an electrode of the same potential as a common electrode CE and an electrode of the same potential as a pixel electrode PE, for example.

(Cross-Sectional Configuration Examples of Display Area)

Figure 3:
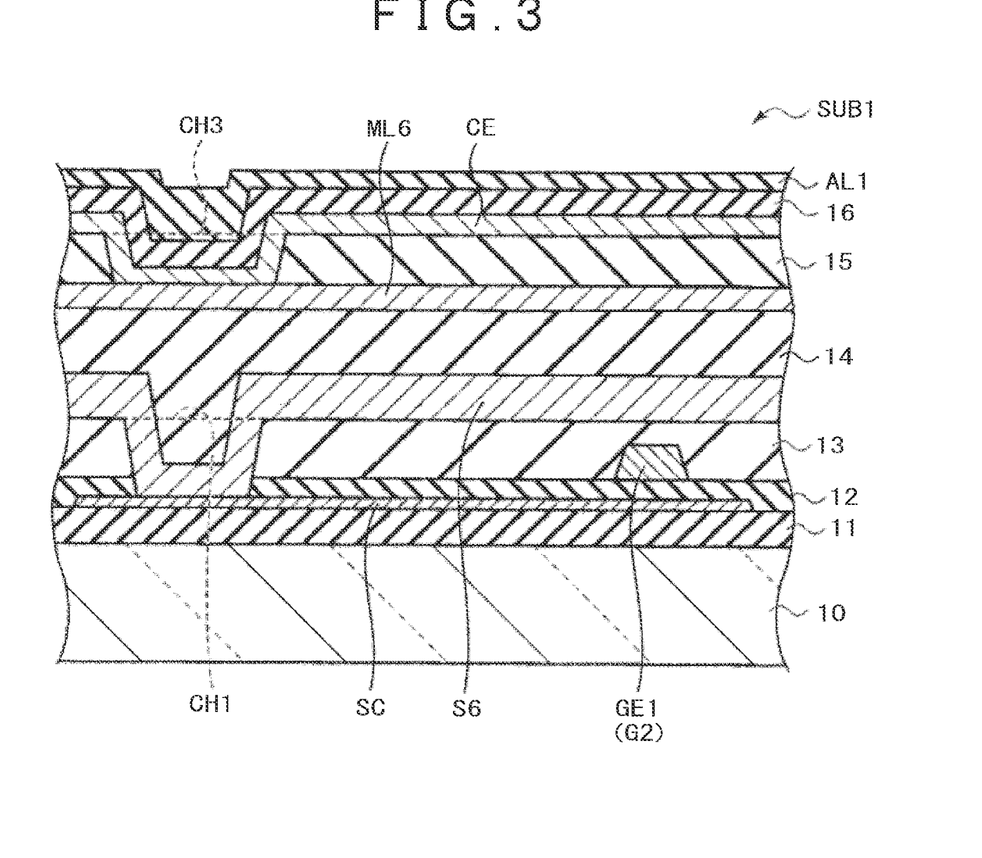
FIG. 3 is a sectional view of a first substrate SUB1 in a display area DA in a display panel PNL.
Figure 4:
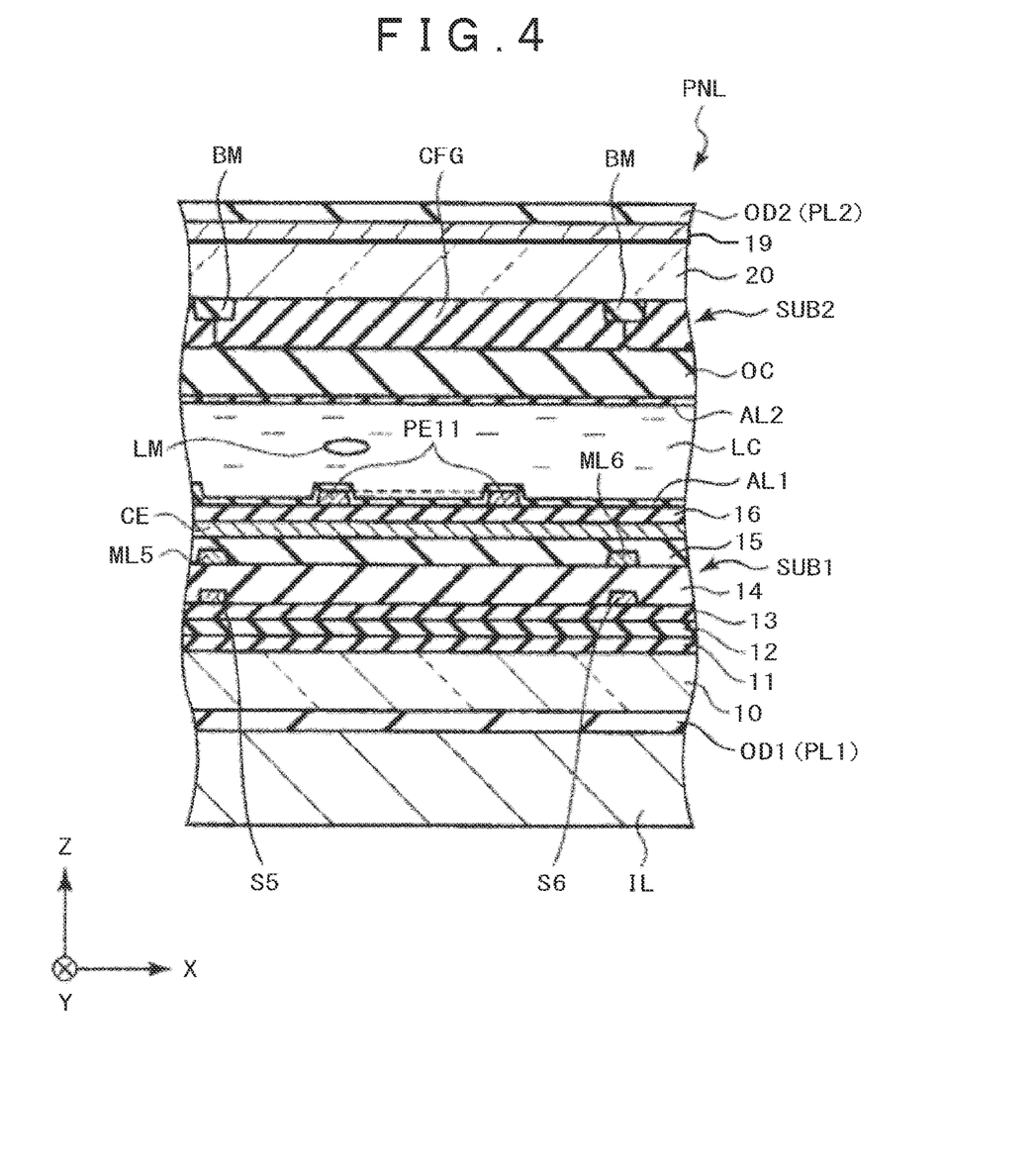
FIG. 4 is a sectional view of a display area DA in a display panel PNL.

FIG. 3 is a sectional view of a first substrate SUB1 in a display area DA in a display panel PNL. FIG. 4 is a sectional view of a display area DA in a display panel PNL. Note that FIG. 3 and FIG. 4 are illustratively explained by using reference numbers such as a scan line G2, signal lines S5, S6, pixel electrodes PE11, etc. but the present invention is not limited to those.

With reference to FIG. 3, a first substrate SUB1 has an insulation substrate 10, insulation films 11 to 16, a semi-conductor layer SC, a scan line (first metal wiring) G2 including a first metal layer, a signal line (second metal wiring) S6 including a second metal layer, a metal wiring (third metal wiring) ML6 including a third metal layer, a common electrode (first transparent electrode) CE including a first transparent conductive film, a pixel electrode (second transparent electrode) PE11 including a second transparent conductive film, an orientation film AL1, and others. Note that the pixel electrode PE11 is explained in FIG. 4 that will be described later.

The insulation substrate 10 is a substrate having optical transparency such as a glass substrate or a resin substrate having flexibility. The insulation film 11 is located over the insulation substrate 10. The semiconductor layer SC is located over the insulation film 11 and covered with the insulation film 12. The semiconductor layer SC includes polycrystalline silicon for example but may also include amorphous silicon or an oxide semiconductor.

A gate electrode GE1 that is a part of the scan line G2 is located over the insulation film 12 and covered with the insulation film (inorganic insulation film) 13. Note that other scan lines not shown in the figure are also located in the same layer as the scan line G2. The scan line G2 may include a metal material such as aluminum (Al), titanium (Ti), silver (Ag), molybdenum (Mo), tungsten (W), copper (Cu), or chromium (Cr), an alloy formed by combining those metal materials, or the like and may also be a single layer structure or a multi-layer structure. In one example, the scan line G2 includes a molybdenum-tungsten alloy.

The signal line S6 is located over the insulation film 13 and covered with the insulation film (first organic insulation film) 14. Note that other signal lines not shown in the figure are also located in the same layer as the signal line S6. The signal line S6 may include any of the aforementioned metal materials, an alloy formed by combining those metal materials, or the like and may also be a single layer structure or a multi-layer structure. In one example, the signal line S6 is a laminate formed by stacking titanium (Ti), aluminum (Al), and titanium (Ti) in this order. The signal line S6 is in contact with the semiconductor layer SC through a contact hole CH1 penetrating the insulation film 12 and the insulation film 13.

The metal wiring ML6 is located over the insulation film 14 and covered with the insulation film (second organic insulation film) 15. The metal wiring ML6 may include any of the aforementioned metal materials, an alloy formed by combining those metal materials, or the like and may also be a single layer structure or a multi-layer structure. In one example, the metal wiring ML6 is a laminate formed by stacking titanium (Ti), aluminum (Al), and titanium (Ti) in this order or a laminate formed by stacking molybdenum (Mo), aluminum (Al), and molybdenum (Mo) in this order.

The common electrode CE is located over the insulation film 15 and covered with the insulation film (inorganic insulation film) 16. The common electrode CE is a transparent electrode including a transparent conductive material such as indium tin oxide (ITO) or indium zinc oxide (IZO). The common electrode CE is in contact with the metal wiring ML6 through a contact hole CH3 penetrating the insulation film 15. The orientation film AL1 is located over the insulation film 16.

The insulation films 11 to 13 and the insulation film 16 are inorganic insulation films including inorganic insulation materials such as a silicon oxide, a silicon nitride, and a silicon oxynitride and may also be single layer structures or multi-layer structures. The insulation film 14 is an organic insulation film (first organic insulation film) including an organic insulation material such as an acrylic resin, for example. The insulation film 15 is an organic insulation film (second organic insulation film) including an organic insulation material such as an acrylic resin, for example. Note that the insulation film 15 may also be an inorganic insulation film. The film thickness of the insulation film 14 is about 2.5 µm, for example. The film thickness of the insulation film 15 is about 1.5 µm, for example.

With reference to FIG. 4, in a first substrate SUB1, signal lines S5 and S6 are located over an insulation film 13 and covered with an insulation film 14. Metal wirings ML5 and ML6 are located just above the signal lines S5 and S6, respectively. Pixel electrodes PE11 are located over an insulation film 16 and covered with an orientation film AL1. The pixel electrodes PE11 are transparent electrodes including a transparent conductive material such as ITO or IZO.

A second substrate SUB2 has a shield conductive layer (ITO for shield) 19, an insulation substrate 20, shading layers BM, a color filter CFG, an overcoat layer OC, an orientation film AL2, and the like.

The shield conductive layer 19 includes a transparent conductive material such as indium tin oxide (ITO) or indium zinc oxide (IZO). The shield conductive layer 19 is located on the outside of the insulation substrate 20. The insulation substrate 20 is a substrate having optical transparency such as a glass substrate or a resin substrate similarly to the insulation substrate 10. The shading layers BM and the color filter CFG are located on the side facing the first substrate SUB1 of the insulation substrate 20. The color filter CFG is located at a position facing the pixel electrodes PE11 and parts of it overlap with the shading layers BM. The overcoat layer OC covers a color filter CFG for green. The overcoat layer OC includes a transparent resin. Other color filters for red and blue are also located at positions facing the pixel electrodes PE11 similarly to the color filter CFG and covered with the overcoat layer OC, respectively. The orientation film AL2 covers the overcoat layer OC. The orientation film AL1 and the orientation film AL2 include materials having a horizontal orientation for example.

In the first substrate SUB1 and the second substrate SUB2 stated above, the orientation film AL1 and the orientation film AL2 are placed so as to face each other. Although it is not shown in the figure, a main spacer and a sub spacer include resin materials and are placed between the first substrate SUB1 and the second substrate SUB2. The main spacer forms a predetermined cell gap between the orientation film AL1 and the orientation film AL2. The cell gap is 2 to 5 µm for example. The first substrate SUB1 and the second substrate SUB2 are bonded with a sealing material in the state of forming the predetermined cell gap.

A liquid crystal layer LC is located between the first substrate SUB1 and the second substrate SUB2 and retained between the orientation film AL1 and the orientation film AL2. The liquid crystal layer LC has liquid crystal molecules LM. The liquid crystal layer LC includes a liquid crystal material of a positive type (permittivity anisotropy is positive) or a liquid crystal material of a negative type (permittivity anisotropy is negative).

An optical element OD1 including a polarizing plate PL1 is bonded to the insulation substrate 10. An optical element OD2 including a polarizing plate PL2 is bonded to the shield conductive layer 19. Note that the optical element OD1 and the optical element OD2 may have a phase difference plate, a scattering layer, an antireflection layer, or the like if necessary.

In such a display panel PNL, in an Off state of not forming an electric field between the pixel electrode PE and the common electrode CE, the liquid crystal molecules LM are initially oriented in a predetermined direction between the orientation film AL1 and the orientation film AL2. In such an Off state, light emitted from an illumination device IL toward the display panel PNL is absorbed by the optical element OD1 and the optical element OD2 and a dark display is obtained. On the other hand, in an On state of forming an electric field between the pixel electrode PE and the common electrode CE, the liquid crystal molecules LM are oriented in a direction different from the initial orientation direction by the electric field and the orientation direction is controlled by the electric field. In such an On state, a part of light from the illumination device IL penetrates the optical element OD1 and the optical element OD2 and a bright display is obtained.

(Configuration Example of Earth Pad)

Figure 5:
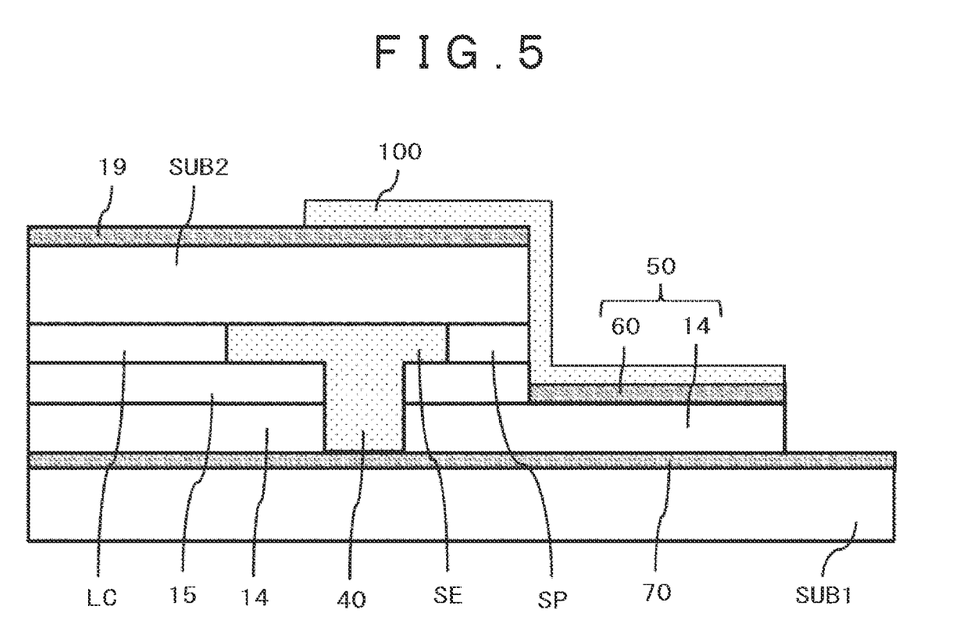
FIG. 5 is a sectional view of a vicinity of an earth pad according to the present embodiment.

FIG. 5 is a sectional view of a vicinity of an earth pad according to the present embodiment. FIG. 5 is a sectional view taken on line A-A in FIG. 1 and shows a sectional view of the part of the earth pad 50.

In FIG. 5, a first substrate SUB1 and a second substrate SUB2 are bonded with a sealing material SE and a liquid crystal layer LC is sandwiched between the first substrate SUB1 and the second substrate SUB2. A wall spacer SP is formed at an end of the second substrate SUB2. As the layers on the side of the first substrate SUB1, only organic insulation films 14 and 15 are described. A groove 40 is formed at parts of the organic insulation films 14 and 15 overlapping with the sealing material SE. The purpose is to prevent moisture from intruding from an exterior through the organic insulation films 14 and 15.

The organic insulation film 14 extends to a part of a mounting section MA where an earth pad 50 is formed. Then the earth pad 50 is formed by forming a connecting transparent conductive film 60 over the organic insulation film 14. As a result, the part under the earth pad 50 can also be used as a wiring area and the area of the mounting section MA can be reduced to that extent. In FIG. 5, a wiring 70 passing through under the earth pad 50 is illustratively shown. The wiring 70 may include a lead-out line of a video signal line, a wiring for power source, a wiring for inspection, and the like.

The earth pad 50 and a shield conductive layer 19 in the second substrate SUB2 are connected through a conductive tape 100. The connecting transparent conductive film 60 in the earth pad 50 is connected to an external connection terminal (GND) for power supply provided in the mounting section MA in the first substrate SUB1 through wiring. A reference potential such as an earth potential or a ground potential is supplied to the external connection terminal (GND).

Figure 6:
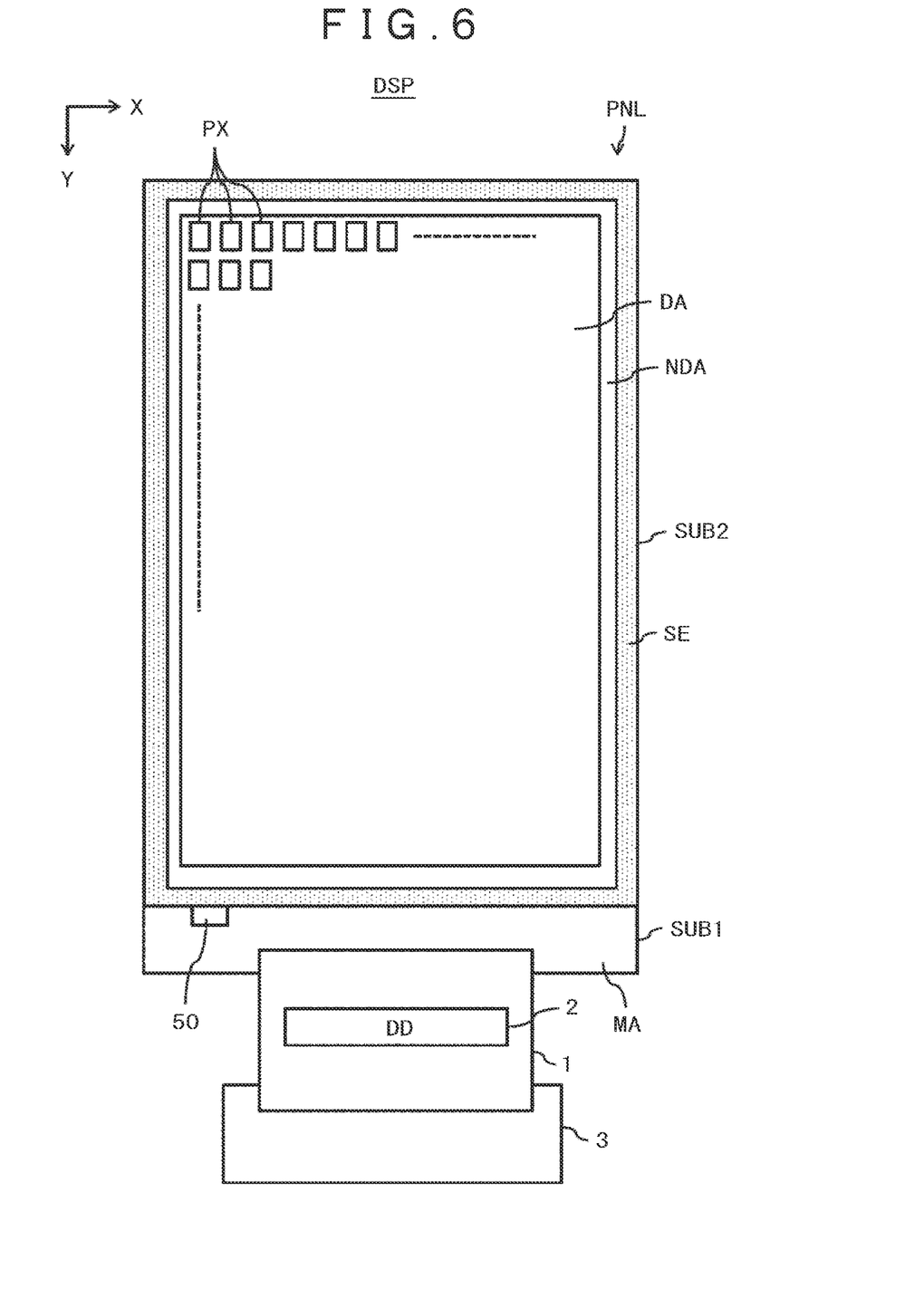
FIG. 6 is a plan view showing an appearance of a display device DSP in the state where a conductive tape does not exist.

FIG. 6 is a plan view showing an appearance of a display device DSP in the state where a conductive tape does not exist. FIG. 6 shows a state before a shield conductive layer 19 and an earth pad 50 are connected through a conductive tape 100. An earth pad 50 is formed at a part of a mounting section MA adjacent to a second substrate SUB2 in FIG. 6. The earth pad 50 includes an organic insulation film 14 and a connecting transparent conductive film 60 formed over the organic insulation film 14. Other configurations are the same as described in FIG. 1.

Figure 7:
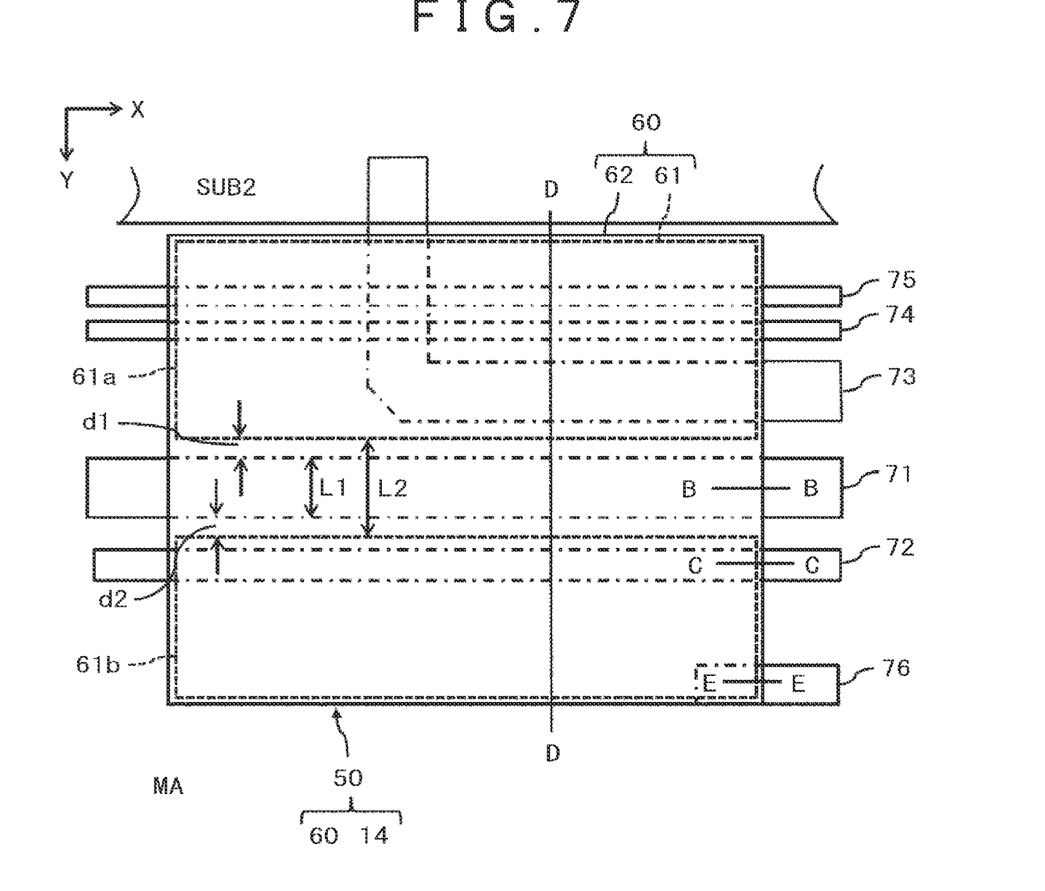
FIG. 7 is a plan view of a vicinity of an earth pad according to the present embodiment.
Figure 8:
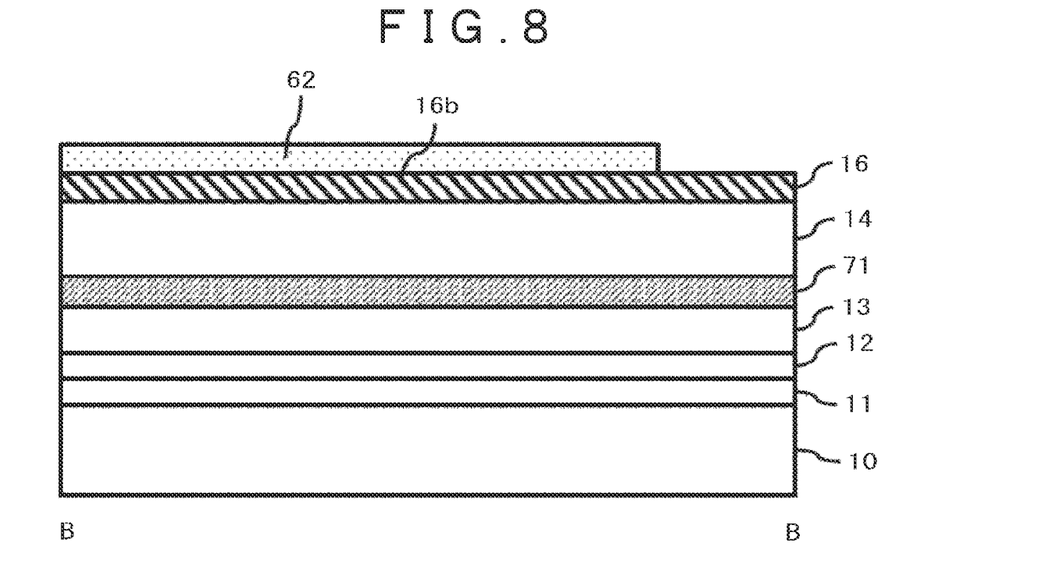
FIG. 8 is a sectional view taken on line B-B in FIG. 7.
Figure 9:
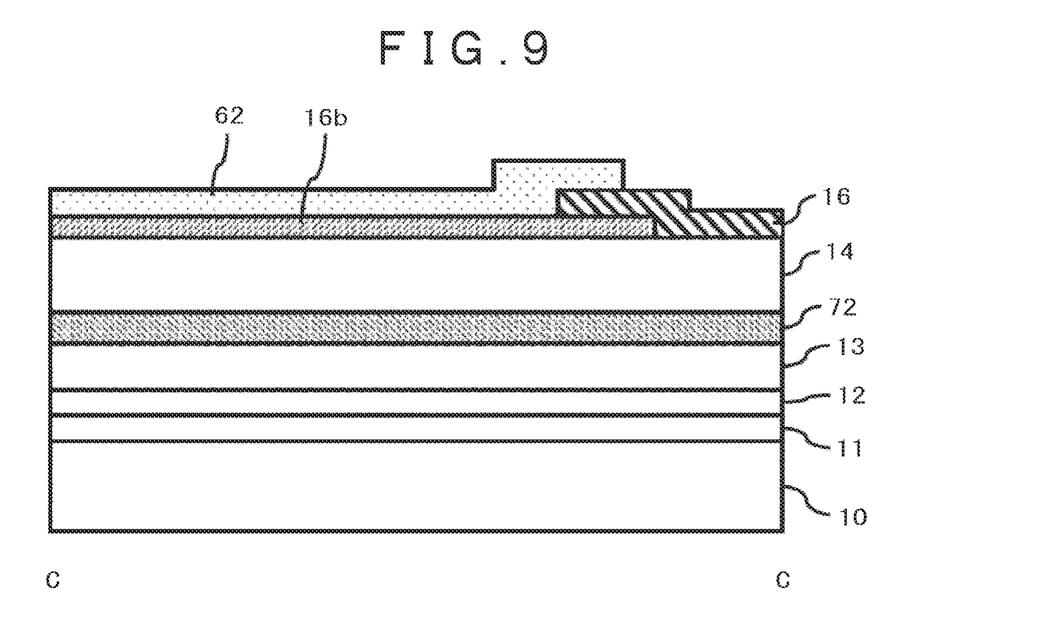
FIG. 9 is a sectional view taken on line C-C in FIG. 7.
Figure 10:
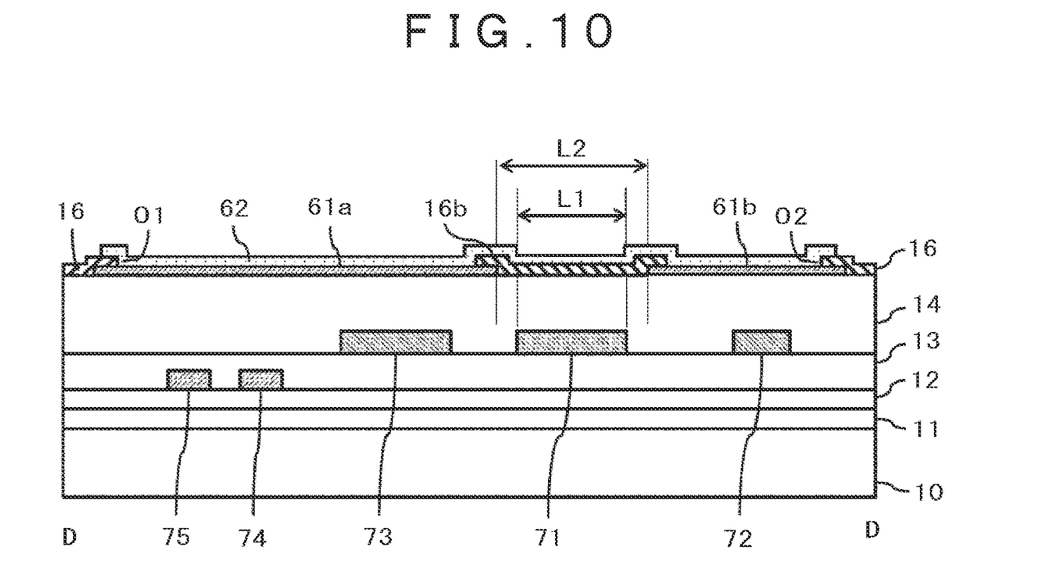
FIG. 10 is a sectional view taken on line D-D in FIG. 7.
Figure 11:
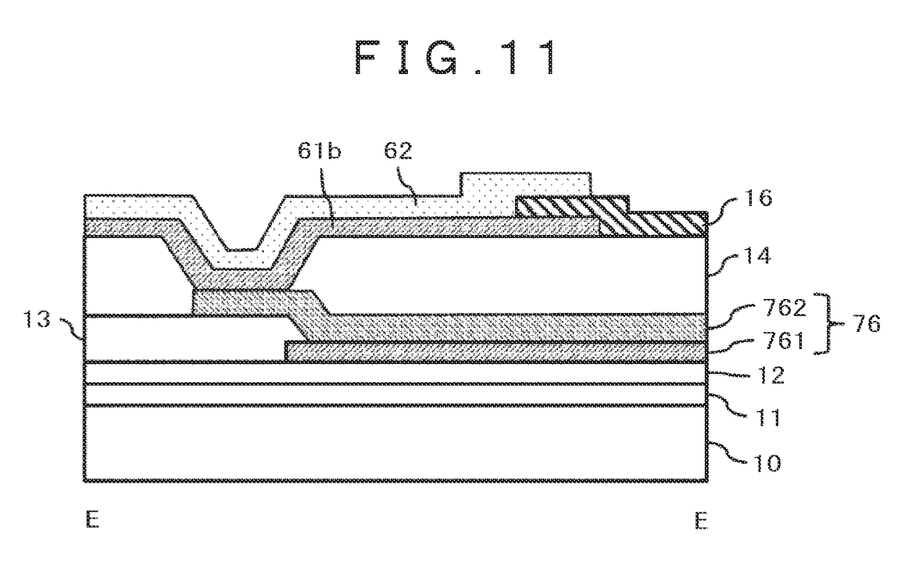
FIG. 11 is a sectional view taken on line E-E in FIG. 7.

FIG. 7 is a plan view of a vicinity of the earth pad 50 in FIG. 6. FIG. 8 is a sectional view taken on line B-B in FIG. 7. FIG. 9 is a sectional view taken on line C-C in FIG. 7. FIG. 10 is a sectional view taken on line D-D in FIG. 7. FIG. 11 is a sectional view taken on line E-E in FIG. 7.

With reference to FIG. 7, in a plan view, an earth pad 50 is provided adjacently to a second substrate SUB2. Although the earth pad 50 adopts a rectangular shape in this example, another planar shape may also be adopted. The earth pad 50 is obtained by forming a connecting transparent conductive film 60 over an organic insulation film 14. A first wiring to a fifth wiring (71 to 75) are formed under the organic insulation film 14.

In this example, in a plan view, the first wiring 71, the second wiring 72, the fourth wiring 74, and the fifth wiring 75 are provided so as to extend linearly along a first direction X and intersect the underside of the earth pad 50. The third wiring 73 has a first wiring part provided along the first direction X and a second wiring part provided along a second direction Y. The wiring part provided along the second direction Y of the third wiring 73 is provided so as to pass through over the fourth wiring 74 and the fifth wiring 75. The third wiring 73 therefore intersects the fourth wiring 74 and the fifth wiring 75 in a plan view.

As it will be described later, the first to third wirings 71 to 73 include wiring layers that are the same layers as signal lines S5 and S6. In contrast, the fourth wiring 74 and the fifth wiring 75 include wiring layers that are the same layers as a scan line G2. Since a plurality of wirings provided under the earth pad 50 are formed by using a plurality of wiring layers in this way, the number of wirings provided in a wiring area under the earth pad 50 can be increased and the area of a mounting section MA can be reduced to that extent.

A power source potential (Vdd) or a first reference potential such as 7 V is supplied to the first wiring 71, for example. The first wiring 71 is a power source wiring for supplying a voltage of a high potential of the scan line G2 in one example.

A ground potential (GND) or a second reference potential such as 0 V that is lower than the first reference potential is supplied to the third wiring 73, for example. The third wiring 73 is a power source wiring for supplying a voltage of a low potential of the scan line G2 in one example.

The first wiring 71 and the third wiring 73 are relatively thick wirings in comparison with the second wiring 72 and the fourth and fifth wirings 74 and 75 in a plan view. Since the relatively thick wirings such as power source wirings are placed in a wiring region under the earth pad 50, the area of the mounting section MA can be reduced to that extent.

A sixth wiring 76 is provided to supply a reference potential such as an earth potential or a ground potential to the earth pad 50. An end of the sixth wiring 76 is electrically connected to the connecting transparent conductive film 60 in the earth pad 50. The other end of the sixth wiring 76 is connected to an external connection terminal (GND) provided at the mounting section MA of a first substrate SUB1. A reference potential such as an earth potential or a ground potential is supplied to the external connection terminal (GND).

In FIG. 7, the connecting transparent conductive film 60 includes a first connecting transparent conductive film 61 and a second connecting transparent conductive film 62. The first connecting transparent conductive film 61 is located in the same layer as a common electrode CE and includes the same material as the common electrode CE. The second connecting transparent conductive film 62 is located in the same layer as a pixel electrode PE11 and includes the same material as the pixel electrode PE11. The second connecting transparent conductive film 62 is formed over the first connecting transparent conductive film 61, and the first connecting transparent conductive film 61 and the second connecting transparent conductive film 62 are electrically connected.

In the example, the first connecting transparent conductive film 61 is divided into a first electrode section 61a and a second electrode section 61b. The second connecting transparent conductive film 62 is provided but the first connecting transparent conductive film 61 is not provided in the area part of the earth pad 50 corresponding to the upper side of the first wiring 71 in a plan view of the earth pad 50. On the other hand, both the second connecting transparent conductive film 62 and the first connecting transparent conductive film 61 (61a, 61b) are provided in layers at the area part of the earth pad 50 corresponding to the upper side of the second to fifth wirings (72 to 75).

In a plan view, a width L1 of the first wiring 71 in the second direction Y is narrower than an interval L2 between the first electrode section 61a and the second electrode section 61b in the second direction Y (L1<L2). In other words, the first wiring 71 of the width L1 is placed within the interval L2 between the first electrode section 61a and the second electrode section 61b in the second direction Y. That is, the first connecting transparent conductive film 61 is provided so as to avoid the upper part of the first wiring 71 in a plan view. For that reason, the first connecting transparent conductive film 61 is divided into the first electrode section 61a and the second electrode section 61b.

Further, in a plan view, an interval d1 between the upper end of the first wiring 71 and the lower end of the first electrode section 61a and an interval d2 between the lower end of the first wiring 71 and the upper end of the second electrode section 61b may desirably be set to about 5 μm, for example.

Although the example of dividing the first connecting transparent conductive film 61 into two of the first electrode section 61a and the second electrode section 61b has been explained in the above description, the present invention is not limited to the example. When the first wiring 71 is provided at a position adjacent to the second substrate SUB2 along an end of the second substrate SUB2, it is unnecessary to divide the first connecting transparent conductive film 61. Further, when a plurality of high potential wirings including the first wiring 71 are provided in a wiring area under the earth pad 50, it is also possible to divide the first connecting transparent conductive film 61 into two or more.

FIG. 8 is a sectional view taken on line B-B in FIG. 7 and a sectional view of a part where a first wiring 71 is placed.

The first wiring 71 is located in the same layer as signal lines S5 and S6 and includes the same material as the signal lines S5 and S6. The first wiring 71 is formed over an insulation film 13 and the first wiring 71 is covered with an organic insulation film 14. The organic insulation film 14 is covered with an insulation film 16 including an inorganic insulation material. A second connecting transparent conductive film 62 is provided over the insulation film 16. Note that, in FIG. 8, the insulation film 16 located under the second connecting transparent conductive film 62 is shown as an insulation film 16b. The insulation film 16b will be explained in FIG. 10 that will be described later. As shown in FIG. 7, in the plan view of the earth pad 50, over the entire area of the part where the first wiring 71 is placed, the first connecting transparent conductive film 61 is not provided and only the second connecting transparent conductive film 62 is provided.

FIG. 9 is a sectional view taken on line C-C in FIG. 7 and is a sectional view of a part where a second wiring 72 is placed.

The second wiring 72 is located in the same layer as signal lines S5 and S6 and includes the same material as the signal lines S5 and S6. The second wiring 72 is formed over an insulation film 13 and the second wiring 72 is covered with an organic insulation film 14. A second electrode section 61b of a first connecting transparent conductive film 61 is selectively provided over the organic insulation film 14. An insulation film 16 is provided so as to cover an end of the second electrode section 61b and a part of the organic insulation film 14 where the second electrode section 61b is not formed. A second connecting transparent conductive film 62 is provided over the second electrode section 61b and over the insulation film 16 to cover the end of the second electrode section 61b. As shown in FIG. 7, in the plan view of the earth pad 50, over the entire area of the part where the second wiring 72 is placed, both the first connecting transparent conductive film 61 and the second connecting transparent conductive film 62 are provided in layers.

With reference to FIG. 10, first to third wirings 71 to 73 are placed over an insulation film 13 and fourth and fifth wirings 74 and 75 are placed over an insulation film 12. The first to third wirings 71 to 73 are located in the same layer as signal lines S5 and S6 and include the same material as the signal lines S5 and S6. The fourth and fifth wirings 74 and 75 are located in the same layer as a scan line G2 and include the same material as the scan line G2.

As shown in FIG. 7, the first electrode section 61a of the first connecting transparent conductive film 61 is provided over the third to fifth wirings 73 to 75. As shown in FIG. 7 and FIG. 9, the second electrode section 61b of the first connecting transparent conductive film 61 is provided over the second wiring 72. As shown in FIG. 7 and FIG. 8, the first connecting transparent conductive film 61 is not provided over the first wiring 71.

An insulation film 16b is provided between the first electrode section 61a and the second electrode section 61b of the first connecting transparent conductive film 61. The insulation film 16b is an insulation film that is the same layer as the insulation film 16. The insulation film 16b is provided so as to cover the surface of the organic insulation film 14 exposed between the first electrode section 61a and the second electrode section 61b and the facing ends of the first electrode section 61a and the second electrode section 61b.

The second connecting transparent conductive film 62 is provided over the first electrode section 61a, the second electrode section 61b, and the insulation film 16b and the first electrode section 61a, the second electrode section 61b, and the second connecting transparent conductive film 62 are electrically connected. The second connecting transparent conductive film 62 is provided so as to cover the first electrode section 61a exposed from an opening O1 provided in the insulation films 16 and 16b, the second electrode section 61b exposed from an opening O2 provided in the insulation films 16 and 16b, the insulation film 16b, and the upper parts of both the ends of the insulation film 16.

The first connecting transparent conductive film 61 and the second connecting transparent conductive film 62 of the earth pad 50 can be formed as follows, for example.

Firstly, in the area of forming the earth pad 50, the first electrode section 61a and the second electrode section 61b of the first connecting transparent conductive film 61 are selectively formed by forming a transparent conductive film at the same time of forming a common electrode CE over an organic insulation film 14 and patterning the formed transparent conductive film.

Successively, in the area of forming the earth pad 50, openings O1 and O2 are formed in an insulation film 16 by forming the insulation film 16 and patterning the insulation film 16. As a result, the first electrode section 61a and the second electrode section 61b are selectively exposed.

Successively, in the area of forming the earth pad 50, the second connecting transparent conductive film 62 is formed by forming a transparent conductive film at the same time of forming pixel electrodes PE11 and patterning the transparent conductive film.

Energization test may sometimes be performed in high temperature and high humidity conditions in order to evaluate and verify the reliability of a display device DSP. In this case, the high temperature means 85° C. and the high humidity means a relative humidity of 85% RH. The energization test is to perform a test of a long time (for example, 240 hours) in the operating state of supplying a power source potential similar to actual operation to a display device DSP.

According to the configuration shown in FIG. 7 and FIG. 8, the first connecting transparent conductive film 61 of a low potential does not exist over the first wiring 71 that is a power source wiring of a high potential and the second connecting transparent conductive film 62 is provided with the insulation films 14 and 16 interposed. When energization test is performed in the high temperature and high humidity conditions, since the first connecting transparent conductive film 61 of a low potential does not exist over the first wiring 71 of a high potential, the problem of corroding the first connecting transparent conductive film 61 due to the effects of a vertical electric field and moisture can be solved.

In a plan view, the earth pad 50 can be prevented from corroding even when the first wiring 71 that is a relatively thick power source wiring is provided in a wiring area under the earth pad 50 and hence the area of the mounting section MA can be reduced to that extent. Further, as a result, it is possible to narrow the frame area of the display device.

FIG. 11 is a sectional view taken on line E-E in FIG. 7 and is a sectional view of a part where a sixth wiring 76 is placed. The sixth wiring 76 takes a laminated structure of a wiring 761 that is located in the same layer as a scan line G2 and includes the same material as the scan line G2 and a wiring 762 that is located in the same layer as signal lines S5 and S6 and includes the same material as the signal lines S5 and S6. An end of the sixth wiring 76, namely an end of the wiring 762, is connected to the second electrode section 61b of the first connecting transparent conductive film 61. The other end of the sixth wiring 76 is connected to an external connection terminal (GND) provided in the mounting section MA. As a result, it is possible to supply a reference potential such as an earth potential or a ground potential to the earth pad 50.

According to the embodiment, one or more of the following effects can be obtained.

1) An earth pad 50 can be prevented from corroding even when energization test is performed in high temperature and high humidity conditions.

2) From above 1), the reliability of a display device can be improved.

3) Since the number of wirings can be increased under an earth pad 50, the area of a mounting section MA can be reduced.

4) In a plan view, since an earth pad 50 can be prevented from corroding even when a first wiring 71 that is a relatively thick power source wiring is provided in a wiring area under the earth pad 50, the area of a mounting section MA can be reduced.

5) From above 4), the frame area of a display device can be narrowed.

All display devices that can be implemented through appropriate design change by those skilled in the art on the basis of the display device described above as the embodiment according to the present invention also belong to the scope of the present invention as long as the gist of the present invention is included.

In the conceptual categories of the present invention, a person skilled in the art can perceive various kinds of changes and modifications and it can be understood that those changes and modifications also belong to the scope of the present invention. For example, appropriate addition, deletion, and design change of a constituent component or addition, omission, and condition change of a process in the aforementioned embodiments by a person skilled in the art are also included in the scope of the present invention as long as they have the gist of the present invention.

Further, other effects brought about by the aspect described in the present embodiments, which are obvious from the descriptions in the present specification or perceived appropriately by a person skilled in the art, are understood as being brought about naturally by the present invention.

Various kinds of invention can be formed by appropriately combining a plurality of constituent components disclosed in the aforementioned embodiments. For example, some constituent components may be deleted from all the constituent components shown in the embodiments. In addition, constituent components in different embodiments may be combined appropriately.

What is claimed is:

1. A display device comprising:
   a first substrate having a pad,
   a second substrate having a shield conductive layer, and
   a conductor connected to the pad and the shield conductive layer,
   wherein the first substrate includes a first wiring provided under the pad;
   the pad includes
      an organic insulation film provided so as to cover the first wiring, and
      a transparent conductive film provided over the organic insulation film;
   the transparent conductive film includes
      a first transparent conductive film provided over the organic insulation film, and
      a second transparent conductive film connected to the first transparent conductive film;
   the first transparent conductive film is provided so as to avoid an upper part of the first wiring in a plan view; and
   the second transparent conductive film is provided so as to cover the first wiring and the first transparent conductive film in a plan view.

2. The display device according to claim 1, wherein the first wiring is a power source wiring.

3. The display device according to claim 2,
   wherein a first reference potential that is a voltage of a high potential is supplied to the power source wiring; and
   a second reference potential lower than the first reference potential is supplied to the pad.

4. The display device according to claim 1,
   wherein the display device includes a second wiring provided adjacently to the first wiring; and
   the first transparent conductive film and the second transparent conductive film are placed over the second wiring in a plan view.

5. The display device according to claim 1, wherein the first transparent conductive film includes the same material as a common electrode provided in the first substrate.

6. The display device according to claim 5, wherein the second transparent conductive film includes the same material as a pixel electrode provided in the first substrate.

7. The display device according to claim 6,
wherein the first substrate further has
- a first organic insulation film, and
- a second organic insulation film formed over the first organic insulation film; and the second organic insulation film includes the same material as the first organic insulation film.

8. The display device according to claim 1,
wherein the first transparent conductive film includes a first electrode section and a second electrode section; and the first wiring is placed between the first electrode section and the second electrode section in a plan view.

9. The display device according to claim 8,
wherein the pad further has an insulation film; and
the insulation film is provided over the organic insulation film exposed between the first electrode section and the second electrode section.

10. The display device according to claim 9,
wherein the first substrate includes a plurality of wirings provided under the pad;
the first wiring includes the same material as a signal line provided in the first substrate; and
the wirings include a wiring of the same material as the signal line and a wiring of the same material as a scan line provided in the first substrate.

11. The display device according to claim 10, wherein the display device is a liquid crystal display device of an IPS system.

* * * * *